Patented May 19, 1936

2,040,858

UNITED STATES PATENT OFFICE 2,040,858

PRODUCTION OF ANTHRAPYRIMIDINES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application August 11, 1932, Serial No. 628,440. In Germany January 21, 1931

12 Claims. (Cl. 260—32)

The present invention relates to a new process of producing compounds of the anthrapyrimidine series. Compounds of this series can be produced by the interaction of anthraquinones containing a primary amino group in an α-position with amides of monobasic carboxylic acids. The course of this reaction may be illustrated by the following typical cases: α-amino-anthraquinone reacts with formamide in accordance with the formulæ

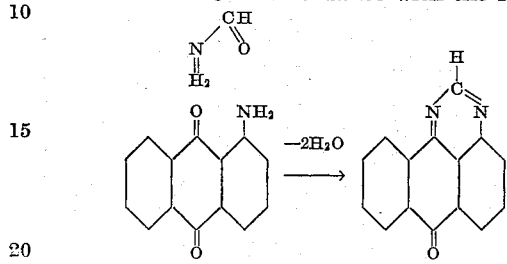

Similarly, by heating 1-amino-5-benzoylamino-anthraquinone with formamide, 5-benzoylamino-1,9-anthrapyrimidine is obtained according to the following formulæ:

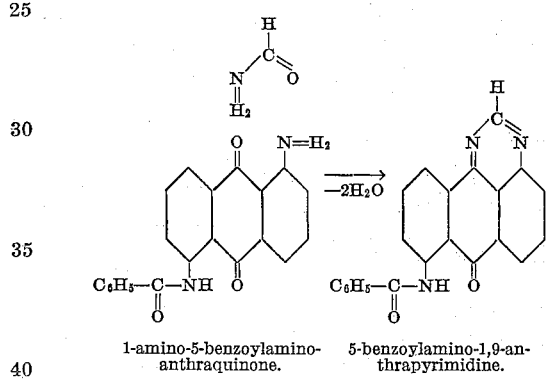

1-amino-5-benzoylamino-anthraquinone.   5-benzoylamino-1,9-anthrapyrimidine.

We have now found that the course of this reaction is greatly improved and accelerated by carrying out the process in the presence of certain catalysts. In this way the compounds of the anthrapyrimidine series are obtained in a very simple manner and with very good yields.

We have found that the catalysts suitable for this purpose are included within the group consisting of copper, mercury, the oxides of molybdenum, tungsten, vanadium, copper, zinc and mercury, and also sodium carbonate, potassium carbonate, sodium acetate, oxalic acid and also boric acid. Examples of catalysts from this class with which very good results are obtained, are metallic copper, copper oxide, vanadium trioxide or pentoxide, anhydrous copper sulphate or chloride, anhydrous zinc chloride, and particularly valuable results are obtained by the use of vanadates, molybdates and tungstates.

The reaction is carried out at elevated temperatures ranging between about 100° and about 200° C., preferably between 150° and 190° C. The amount of catalyst added ranges as a rule between 1 and 15 per cent (calculated by weight of the aminoanthraquinone used), and preferably between 5 and 10 per cent. Preferably the reaction is carried out in the presence of diluents such as nitro benzene, trichlorbenzene or phenol and its homologues. In some cases, for example when the α-amino group is only difficultly convertible into the pyrimidine ring, as is the case for example with polyaminoanthraquinones, it may be advantageous to employ an excess of the carboxylic acid amide as the diluent.

As regards the initial materials which may be treated in accordance with the present invention, it will be seen from the above formulæ that it is essential that the anthraquinone should contain at least one primary amino group in an α-position. Otherwise, however, the anthraquinones may be substituted as desired. Suitable anthraquinones which may be used according to the present invention are for example α-aminoanthraquinone, and its derivatives such as α-aminoanthraquinones containing halogen, mono- or dialkylamino- or acylamino-α-aminoanthraquinones, such as 1-amino-4-benzoylamino-anthraquinone, 1 - amino - 4,p-chlorobenzoylamino - anthraquinone, 1,4-, 1,5-, 1,6-, 1,7- or 1,8-diamino-anthraquinone, 5 - amino - anthraquinone - 2,1'-carbaminoanthraquinone and the leuco compounds of the said compounds.

Any carboxylic acid amides may be used in the present process, and formamide, acetamide, propionic amide, or benzamide may be mentioned as typical examples of acid amides which may be used, though of course our invention is not restricted to the use of these particular acid amides. As will be understood from the above formulæ, anthrapyrimidines substituted on the Py-C atom by organic radicals may be produced by employing another acid amide than formamide, for example acetic amide, for the condensation with an alpha-aminoanthraquinone.

Substitution products of anthrapyrimidine may, however, also be produced by other methods. Thus, when starting from α-aminoanthraquinones containing a further amino group acylamino-anthrapyrimidines may be formed by condensation with organic acids, whereby in case such acids of higher molecular weight are used, these are preferably employed in the form of their anhydrides or still better in the form of their halides, in particular chlorides and previous or subsequent formation of the pyrimidine ring. When acylamino - α - aminoanthraquinones are employed the acyl group may be split off, if so desired, either during the formation of the pyrimidine ring or if desired subsequently. Anthrapyrimidine derivatives may also be prepared by condensing 1-nitroanthraquinone carboxylic or sulphonic acids or halides thereof with amines, reducing the nitro group and condensing the reduction products with acid amides to form the pyrimidine ring.

The preparation of acylaminoanthrapyrimidines by condensation of aminoanthraquinones or halogen anthraquinones with organic acids, anhydrides or halides, or acid amides, respectively, before the formation of the pyrimidine ring, is best carried out in an inert organic solvent or diluent, in particular aromatic solvent or diluent of high boiling point, for example nitrobenzene, halogenbenzenes, nitro and halogen derivatives of homologues of benzene, naphthalene and its halogen derivatives and the like. The condensation is best carried out at temperatures above 100° C. and may be accelerated by the addition of condensing catalysts, such as metals and metal compounds, for example copper and iron, their oxides and salts thereof, such as their acetates and carbonates. Acid binding agents are also preferably added, for example pyridine, quinoline, tertiary organic bases, such as dimethylaniline, sodium and potassium carbonates, acetates and phosphates. The formation of the pyrimidine ring when starting from anthraquinones can be carried out in the absence as well as in the presence of indifferent diluents, for example phenol, nitrobenzene, trichlorbenzene.

According to the present invention the reaction products are usually obtained in good yields and in a crystalline form. If necessary they may be purified by the usual methods, as for example by crystallization, sublimation, if desired under reduced pressure or treatment with oxidizing agents, for example in the form of their aqueous pastes with hypochlorite solution. They may be used as intermediate products for the preparation of dyestuffs and part of them is suitable for use as dyestuffs. Furthermore they may be purified by extraction with boiling solvents, or by precipitating their salts, for example their sulphates from their solutions in sulphuric acid. By these methods they may also be separated from isologous and isomeric compounds.

As will be seen from the foregoing explanations, the present invention may find application for example as follows: From α-aminoanthraquinone by a short treatment with formamide in nitrobenzene at a temperature of 180° to 185° C. in the presence of a few per cent of vanadium trioxide, 1,9-anthrapyrimidine is obtained in a nearly theoretical amount. From 1-amino-4-(p-chlorobenzoylamino)-anthraquinone or 1-amino-4-benzoylamino-anthraquinone with formamide in nitrobenzene in the presence of ammonium vanadate the corresponding anthrapyrimidine derivatives are formed readily. By heating 1,4-diaminoanthraquinone with formamide in nitrobenzene, trichlorobenzene or anisole in the presence of ammonium vanadate, 4-amino-1,9-anthrapyrimidine or 1,9,4,10-anthradipyrimidine are produced rapidly and with a good yield.

The following examples will further illustrate the nature of this invention but the invention is not restricted to these examples. The parts are by weight.

Example 1

50 parts of α-aminoanthraquinone are heated together with 100 parts of formamide and 100 parts of nitrobenzene in the presence of 5 parts of ammonium vanadate at between 180° and 190° C. until a sample, when dissolved in concentrated sulphuric acid, does not longer change in color when formaldehyde is added. Then the mixture is allowed to cool and the precipitated reaction product is filtered off by suction, washed with alcohol and hot water and dried. 1,9-anthrapyrimidine is obtained in a nearly quantitative yield. It is a brownish crystalline powder which is soluble in concentrated sulphuric acid giving a yellow coloration which does not change when formaldehyde is added.

Instead of ammonium vanadate other catalysts such as vanadium trioxide or vanadium pentoxide may be used.

Example 2

200 parts of 1,4-diaminoanthraquinone are heated in 400 parts of nitrobenzene after the addition of 400 parts of formamide and 10 parts of ammonium vanadate at 170° C. while stirring, until a sample spread out on unglazed porcelain shows no longer a violet seam. This is usually the case already after from 1½ to 2 hours. The reaction mixture is allowed to cool and the 4-amino-1,9-anthrapyrimidine which crystallizes in the form of coarse needles is filtered off by suction. The yield amounts to more than 90 per cent of the theoretical quantity.

The reaction may be carried through at higher temperatures, for example at 185° C., or at lower temperatures, for example at 140° C., whereby the period necessary for completing the reaction is shorter or longer, respectively.

If the heating is continued for a longer period at temperatures of between 170° and 185° C., 1,9,4,10-anthradipyrimidine is obtained.

Instead of nitrobenzene, trichlorbenzene or anisole may be employed as diluents.

If 1,4-diamino-2-methylanthraquinone is treated in an analogous manner, 4-amino-2-methyl-1,9-anthrapyrimidine is obtained; from 1-amino-4-chloro-2-methylanthraquinone, 2-methyl-4-chloro-1,9-anthrapyrimidine is produced in a similar manner.

Example 3

100 parts of 1-amino-4-benzoylamino-anthraquinone are heated in 200 parts of nitrobenzene after the addition of 200 parts of acetamide and 10 parts of ammonium vanadate until the reaction mixture has become orange in color. After cooling the reaction mixture is worked up in the usual manner. The reaction product obtained crystallizes in needles and gives a violet vat from which cotton is dyed orange shades of great fastness.

Example 4

100 parts of leuco-1,4-diaminoanthraquinone are heated in 200 parts of nitrobenzene after the addition of 200 parts of formamide and 10 parts of ammonium vanadate at 170° C. while stirring, until a sample has a melting point of about 270° C. after working up. Then the reaction mixture is allowed to cool and worked up in the usual manner. The 4-amino-1,9-anthrapyrimidine thus obtained is identical with the reaction product of Example 2.

*Example 5*

10 parts of 5-aminoanthraquinone-2,1'-carbaminoanthraquinone (corresponding to the formula

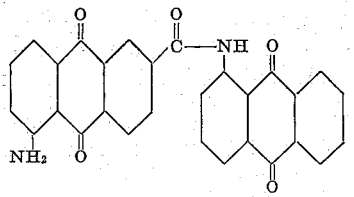

and obtainable by acylating α-aminoanthraquinone with 5-nitroanthraquinone-2-carboxylic acid and reducing the acylation product) are heated to boiling for several hours with 200 parts of formamide in 400 parts of phenol with an addition of boric oxide, zinc chloride or a copper salt, the reaction mixture then being diluted with ethyl alcohol and worked up as usual. The reaction product, the 1'-anthraquinone-2-carbamino-5,10-anthrapyrimidine corresponds to the formula

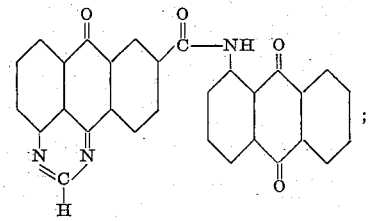

it is a brown yellow powder which is difficultly soluble and may be purified by means of oxidizing agents, for example by means of an alkali metal hypochlorite. It dissolves in concentrated sulphuric acid to give an olive yellow solution and furnishes yellow dyeings on cotton from a brown violet vat.

The reaction may also be carried out in trichlorbenzene or nitrobenzene.

Similar reaction products are obtained in an analogous manner by treating acylamines of other α-aminoanthraquinone carboxylic acids with formamide.

In the same manner α-aminoacylaminopyridinoanthraquinones may be converted by means of formamide into acylaminopyridinoanthrapyrimidines.

*Example 6*

25 parts of 1,5-diaminoanthraquinone are heated with 75 parts of formamide, 100 parts of phenol and a small quantity of oxalic acid or boric acid anhydride while stirring until a sample has the melting point of 250° C. after being worked up. The reaction mixture is allowed to cool and if necessary diluted with methyl alcohol. The 5-amino-1,9-anthrapyrimidine formed is filtered off by suction; it is a brownish yellow powder which dissolves in concentrated sulphuric acid giving a yellow orange color and gives an orange colored vat from which cotton is dyed bluish-red shades. By recrystallizing the product from high boiling organic solvents or by dissolving it in concentrated sulphuric acid and cautiously adding water, it is obtained in the form of violet to brownish red needles melting at 256° to 257° C.

The reaction may be carried out also in a liquid mixture of phenol and its homologues.

From 1-amino-5-methylamino-anthraquinone, 5-methylamino 1,9-anthrapyrimidine, from 1,5-diamino-4-methoxy-anthraquinone a mixture of 5-amino-4- and 8-methoxy-1,9-anthrapyrimidines can be produced in a similar manner.

1,8-diaminoanthraquinone may be converted in an analogous manner into 8-amino-1,9-anthrapyrimidine which is a brown powder, dissolves in concentrated sulphuric acid giving an olive brown color and which gives brown dyeings from a brown alkaline hydrosulphite vat.

Tetrachloro-1,5-diaminoanthraquinone yields a 5-amino-1,9-anthrapyrimidine which contains chlorine.

5-benzoylamino-1,9-anthrapyrimidine which is obtainable in an analogous manner from 1-amino-5-benzoylaminoanthraquinone and formamide, is converted into 5-amino-1,9-anthrapyrimidine by dissolving the said benzoyl compound in concentrated sulphuric acid while adding the quantity of water necessary for saponifying the benzoyl group (about $\frac{1}{10}$ of the quantity of concentrated sulphuric acid employed) and heating up to 120° C. The saponification product has the same properties as the product obtained according to the first paragraph of this example.

*Example 7*

25 parts of 1,7-diaminoanthraquinone are heated to boiling for some hours with 100 parts of formamide, 100 parts of phenol and 10 parts of ammonium vanadate. Then the reaction mixture is allowed to cool down to 80° C. After diluting with 200 parts of ethyl alcohol the reaction product is filtered off by suction. It is a brown powder crystallizing in bluish-red needles and dissolving in concentrated sulphuric acid giving a greenish yellow color. Cotton is dyed bluish red shades from the orange colored alkaline hydrosulphite vat.

If 1,6-diaminoanthraquinone is employed as initial material the reaction product is 6-amino-1,9-anthrapyrimidine.

*Example 8*

100 parts of 1,5-diaminoanthraquinone are heated to 185° to 190° C. with 150 parts of nitrobenzene, 50 parts of phenol, 200 parts of formamide and 10 parts of anhydrous cupric sulphate while stirring whereby the water formed during the reaction is distilled off. When a sample dissolved in sulphuric acid and precipitated by the addition of water separates in violet flocks, the reaction mixture is allowed to cool and the solvents are distilled off by means of steam. The solid residue is filtered off from the aqueous medium by suction and dried. The reaction product obtained has the same properties as the reaction product described in Example 6.

In order to purify the crude product 100 parts thereof are dissolved in 500 parts of .96 per cent sulphuric acid. Water is added until a concentration in sulphuric acid of 60 per cent results. The mixture is allowed to cool down to 20° to 30° C. and the undissolved matter is filtered off by suction and washed with 60 per cent sulphuric acid. Water is added to the filtrate and the resulting precipitate is filtered off by suction, washed until it is neutral and dried.

If the reaction is carried out in nitrobenzene instead of a mixture of nitrobenzene and phenol it is advantageous to add a further 100 parts of formamide after 1 to 2 hours.

Example 9

100 parts of 1,8-diaminoanthraquinone are heated with 100 parts of nitrobenzene, 100 parts of phenol, 200 parts of formamide and 20 parts of boric acid at 185° to 190° C. while stirring and distilling off the water formed during the reaction. When a sample dissolved in sulphuric acid and precipitated by water separates in violet-blue flocks, the reaction mixture is allowed to cool and the crystalline 8-amino-1,9-anthrapyrimidine formed is filtered off by suction. It forms violet-red needles, dissolves in concentrated sulphuric acid giving a golden yellow color and gives a brown vat.

Example 10

100 parts of 1-amino-5-benzoylaminoanthraquinone are heated with 200 parts of formamide, 200 parts of phenol and 5 parts of ammonium vanadate for about 1½ hours at 180° to 190° C. Then 200 parts of water are added and after cooling the reaction product is filtered off by suction and washed with hot water to which advantageously a small quantity of caustic soda solution is added. The reaction product obtained in a nearly quantitative yield is 5-benzoylamino-1,9-anthrapyrimidine.

Instead of ammonium vanadate other catalysts may be employed, for example sodium vanadate, ammonium molybdate, cupric chloride, metal oxides such as cupric oxide, vanadium trioxide and pentoxide and metals as for example copper.

Also if nitrobenzene is employed instead of phenol 5-benzoylamino-1,9-anthrapyrimidine is obtained, the reaction period being 2 hours. The reaction product may be saponified, for example in the manner described in Example 6.

Example 11

50 parts of 1,7-diaminoanthraquinone are heated with 100 parts of formamide, 100 parts of nitrobenzene and 5 parts of ammonium vanadate at 180° to 190° C. until the color of a sample dissolved in concentrated sulphuric acid does no longer change when formaldehyde is added. Then the reaction mixture is diluted at about 80° C. with 100 parts of alcohol. The reaction product is filtered off by suction and washed with alcohol and hot water; it is a brown crystalline powder. According to analysis and its properties the reaction product is 7-amino-1,9-anthrapyrimidine. After being recrystallized twice from trichlorbenzene its melting point is 278° to 281° C.; it dissolves in concentrated sulphuric acid giving a yellow color. If the sulphuric acid solution is diluted with water a violet sulphate is precipitated.

In a similar manner 6-amino-1,9-anthrapyrimidine may be produced from 1,6-diaminoanthraquinone.

This application is a continuation in part of our co-pending application Ser. 586,692, filed January 14th, 1932.

What we claim is:—

1. The process of producing anthrapyrimidines which comprises heating an α-amino-anthraquinone with an amide of an acid selected from the class consisting of the aliphatic monocarboxylic acids and benzoic acid to between about 100° and about 200° C. in the presence of a catalyst selected from the group consisting of copper, and copper compounds.

2. The process of producing anthrapyrimidines which comprises heating an α-amino-anthraquinone with an amide of an acid selected from the class consisting of the aliphatic monocarboxylic acids and benzoic acid to between 150° and 190° C. in the presence of a catalyst selected from the group consisting of copper, and copper compounds.

3. The process of producing anthrapyrimidines which comprises heating an α-amino-anthraquinone with an amide of an acid selected from the class consisting of the aliphatic monocarboxylic acids and benzoic acid to between about 100° and about 200° C. in the presence of between 1 and 15 per cent (calculated with reference to the weight of the amino-anthraquinone) of a catalyst selected from the group consisting of copper, and copper compounds.

4. The process of producing anthrapyrimidines which comprises heating an α-amino-anthraquinone with an amide of an acid selected from the class consisting of the aliphatic monocarboxylic acids and benzoic acid to between about 100° and about 200° C. in the presence of between 5 and 10 per cent (calculated with reference to the weight of the amino-anthraquinone) of a catalyst selected from the group consisting of copper, and copper compounds.

5. The process of producing anthrapyrimidines which comprises heating an α-amino-anthraquinone with an aliphatic monocarboxylic acid amide to between about 100° and about 200° C. in the presence of a catalyst selected from the group consisting of copper, and copper compounds.

6. The process of producing anthrapyrimidines which comprises heating an α-amino-anthraquinone containing at least one further amino group with an amide of an acid selected from the group consisting of the aliphatic monocarboxylic acids and benzoic acid to between about 100° and about 200° C. in the presence of a catalyst selected from the group consisting of copper, and copper compounds.

7. The process of producing anthrapyrimidines which comprises heating an α-amino-anthraquinone containing at least one further amino group with an aliphatic monocarboxylic acid amide to between about 100° and about 200° C. in the presence of a catalyst selected from the group consisting of copper, and copper compounds.

8. The process of producing anthrapyrimidines which comprises heating an α-amino-anthraquinone with formamide to between about 100° and about 200° C. in the presence of a catalyst selected from the group consisting of copper, and copper compounds.

9. The process of producing anthrapyrimidines which comprises heating an α-amino-anthraquinone containing at least one further amino group with formamide to between about 100° and about 200° C. in the presence of a catalyst selected from the group consisting of copper, and copper compounds.

10. A process as claimed in claim 9, in which the amino-anthraquinone is 1,5-diamino-anthraquinone.

11. A process as claimed in claim 9, in which the amino-anthraquinone is 1,7-diamino-anthraquinone.

12. A process as claimed in claim 9, in which the amino-anthraquinone is 1,8-diamino-anthraquinone.

MAX ALBERT KUNZ.
KARL KOEBERLE.